Figure 1:
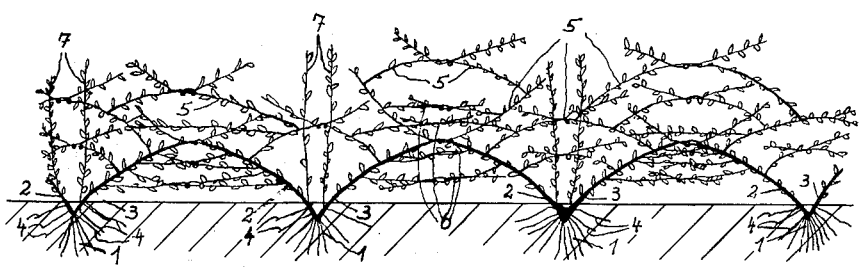

United States Patent Office 2,988,850
Patented June 20, 1961

2,988,850
METHOD OF CULTIVATING A FRUIT HEDGE FROM GRAFTED WOOD
Josef Hechinger, Waizenbach Post Vilshofen, Germany
Filed Oct. 26, 1959, Ser. No. 848,678
Claims priority, application Germany Nov. 11, 1958
3 Claims. (Cl. 47—6)

The invention relates to a method of cultivating a self-supporting multiple-stemmed fruit-hedge, especially for pears and apples, which will bear more or less entirely from scion wood, considerably facilitates management and especially harvesting, requires no support or fastening, produces better crops and can be easily renewed in case of frost or other damage.

It is known to grow fruit-hedges without support. The method consists in planting young fruit stock which had been budded a year before, 2.50 meters apart at an angle of 30 degrees from the surface of the ground and sufficiently deep so that the place of the graft is below the surface of the soil. Since the plants have been planted in a slanting position the new shoots produced by them are expected to be at the same angle, so that if such shoots are not cut back they eventually will cross the shoots of the neighbouring plants. Wherever they cross, the shoots of adjacent plants are tied together with an elastic wire. Those wires have to be renewed continuously during the growth of the plants, in order to prevent girdling and breakage. If the wires are tied too loose in order to avoid the necessity for frequent changes, they do not give sufficient support to the plants and slide, especially when the hedge carries a great deal of fruit. Since each of the plants only produces one useful shoot, it will take considerable time before the hedge is fully developed and has filled in sufficiently. Also it is doubtful whether a shoot in the opposite direction is produced from the first buds at all. The location of the graft of the plants is not deep enough under the ground to be able to produce shoots from the subterranean part which is still above the graft, so that after frost damage, etc., only shoots produced from below the graft will be left, which are useless. Thus the hedge produced by the known method described above is too loosely tied together to give proper support and is not able to offer resistance to heavy crops and stormy weather.

According to the invention these disadvantages are removed by providing two subterranean scion woods at each of the planting places or locations along the line or row of the proposed hedge, and the two scion woods at each planting place are trained in opposite directions. The same are helically interwoven with the corresponding shoots of the neighbouring plants, and by treating the other twigs and side shoots in the same way the resulting hedge will be strong and self-supporting. This results in earlier flowering and fruiting at the proper time. By winding the shoots and twigs around each other in a screw-shaped or helical manner the position of the same becomes stable and self-supporting arches are produced which can bear even heavy crops without any additional support.

On every stock two buddings are made close to the base of the stem. Thus each plant produces two shoots which are directed toward two neighbouring plants at opposite sides of the plant in question. The same result can be accomplished when instead of one plant with two shoots, at each planting location, two plants with one shoot each are planted at each planting location. Since each planting or stock produces two shoots trained in opposite directions, the hedge grows and fills in far more rapidly. By budding lower than usual, that is, close to the base of the stem, and planting deeper, roots are able to develop above the location of the graft, so that the scion wood produces its own root system. Since the scion has its own roots, in case of total or partial damage to the parts of the plants above the ground caused by frost, etc., an immediate renewal from the roots and subterranean parts of the plants is possible. By training the shoots originally produced at a relatively small angle to the surface of the ground, the hedge will not be leggy and may even be filled out at the base.

In order to attain better fruiting, suitable shoots which have not yet reached the required length for being helically interwoven with shoots of adjacent plantings can be put into a horizontal position by slipping supports under the lateral arches or other shoots and twigs.

Figure 2:
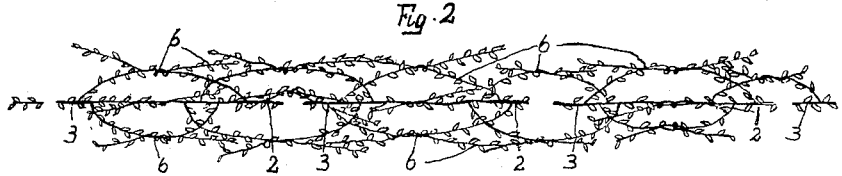

Referring to the drawing:

FIG. 1 is a side view of a hedge several years of age and grown from plants which were doubly budded, and FIG. 2 is a top plan view of the hedge of FIG. 1.

1 are the stock plants planted 2 to 3 meters apart in the desired line which have been budded with two scion woods 2 and 3. Those plants are used which had been budded one or two years previously. Planting of the stocks has to be considerably deeper than normally practiced, so that new roots 4, as well as new shoots for the purpose of renewal and regeneration, can grow at and above the location of the graft. Since both shoots 2 and 3 have formed their own root system, they are practically independent of the stocks.

At planting, both shoots on each plant have to be bent apart so as to be each disposed at an approximate angle of 30 degrees with respect to the surface of the soil. They can be held in this position by the use of wooden hooks driven into the ground. When the shoots 2 and 3 have reached sufficient length so that they cross the shoots of the neighbouring plants, the crossing shoots are wound helically around each other. Eventually the helically wound shoots will grow together, so that they produce a uniform arch-like support.

Other shoots and twigs produced from the original shoots of adjacent plants are connected with each other in the same manner. Thus the shoots developing from the main shoots forming the arches 5 are connected in the vertical median plane of the hedge and the other shoots 6 extend at angles to the median plane or horizontally, so that the hedge broadens and increases vertically as well as horizontally by the formation of arches. By such connections, the hedge may reach a height of 2.50 to 4 meters and a width of 2 meters.

From below the surface of the ground, but above the place of the graft subterranean shoots 7 develop on both main shoots 2 and 3 similar to the sprouts formed by fruiting shrubs for instance currants and gooseberries. These shoots 7 are for reserve and can be helically wound around the corresponding shoots of adjacent plants in the hedge to foster the build-up of the hedge. In case of frost damage and other types of damage to the stems these shoots 7 permit the necessary renewal.

By helically interweaving shoots with each other and by lowering of the shoots the sapflow of the plants will be inhibited at the places where the shoots have been wound around each other, which has the well-known beneficial results for orchard trees. When the shoots have been wound together at the proper time there will be some induction of fruiting even in the same year and the beginning of the period of fertility can be accelerated. The arches of shoots produced by helically winding them around each other are self-supporting and do not require any additional support or tying material. This not only refers to the arches formed from the main shoot but also for all the other arches formed later from twigs and side shoots. As a result of the winding together of the shoots a relatively low hedge is formed which makes its management and especially harvesting considerably easier. A greater amount of fruit is produced by reason of greater fertility and more economic use of the planting space is attained, so that the new fruiting hedge has very distinct advantages.

The stock used for the budding may be grown from seedlings or can be obtained by vegetative means of propagation.

Instead of stocks with scion woods, bushes with more twigs or side shoots planted in two or more rows may be used the twigs or side shoots of which are helically interwoven with all neighbouring plants so that covered walks with fruit trees are formed between the adjacent rows.

I claim:

1. A method of cultivating a fruit hedge from grafted wood, comprising planting stock plants at a plurality of spaced apart locations arranged in a row with each of said locations having two subterranean scion woods, training said two scion woods at each location in opposed directions so that the main shoots from said scion woods at each location grow toward the corresponding main shoots from the adjacent planting locations, helically interweaving the main shoots which grow toward each other from the adjacent planting locations, and also helically interweaving the twigs and side shoots growing from the main shoots of adjacent planting locations so as to form self-supporting arches from the helically interwoven main shoots, twigs and side shoots extending between the successive planting locations along said row.

2. A method of cultivating a fruit hedge as in claim 1; wherein a single stock is planted at each of said planting locations and produces said two subterranean scion woods at the related location.

3. A method of cultivating a fruit hedge as in claim 1; wherein each of said stock plants has been budded at least one year prior to the planting thereof to form the hedge.

References Cited in the file of this patent

Scientific American (magazine), July 21, 1860, "New Series," volume 3, No. 4, page 55, article "A Column of Varieties."

"Grafting and Budding" (Baltet), published 1882 by Crosby Lockwood & Co. (London). Pages 58 through 63, 78, 79, 126 through 129 are relied on.